United States Patent
Kim et al.

(10) Patent No.: US 7,248,428 B2
(45) Date of Patent: Jul. 24, 2007

(54) METHOD, MEDIUM, AND APPARATUS CONTROLLING TRACK SEEK IN A RECORDING AND/OR REPRODUCING APPARATUS

(75) Inventors: Nam-guk Kim, Anyang-si (KR);
Sang-hoon Chu, Yougin-si (KR);
Cheol-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 11/291,926

(22) Filed: Dec. 2, 2005

(65) Prior Publication Data

US 2006/0119978 A1  Jun. 8, 2006

(30) Foreign Application Priority Data

Dec. 2, 2004  (KR) .................. 10-2004-0100356

(51) Int. Cl.
*G11B 5/596* (2006.01)
*G11B 5/55* (2006.01)

(52) U.S. Cl. ............................. 360/78.06; 360/78.09
(58) Field of Classification Search ............... None
See application file for complete search history.

(56) References Cited

U.S. PATENT DOCUMENTS 6,614,615 B1 * 9/2003 Ju et al. ................. 360/78.04

2003/0072102 A1 * 4/2003 Kisaka ................. 360/78.07

FOREIGN PATENT DOCUMENTS

| JP | 8-7506 | 1/1996 |
|---|---|---|
| JP | 10-241306 | 9/1998 |
| JP | 2002-133799 | 5/2002 |
| JP | 2002-279740 | 9/2002 |
| KR | 2004-52273 | 6/2004 |

* cited by examiner

*Primary Examiner*—Andrea Wellington
*Assistant Examiner*—Jason Olson
(74) *Attorney, Agent, or Firm*—Staas & Halsey LLP (57) ABSTRACT

A method, medium, and apparatus controlling a hard disk drive, and more particularly, a method, medium, and apparatus controlling a track seek of a hard disk drive, where the hard disk drive compensates for a gain distortion and a phase delay caused by a notch filter and a VCM driver using a sinewave acceleration trajectory. According to the method of controlling a track seek of a hard disk drive, an ideal sinewave for obtaining a position $y^*(n)$, a velocity $v^*(n)$, and an acceleration $a^*(n)$, according to a sinewave acceleration trajectory, and a sinewave indicating a gain distortion and a phase delay may be integrated and a VCM driving current $u(n)$ can be generated by the integrated sinewave for compensating for gain distortion and phase delay, compensating for a value $C(j2\pi f)$ of the gain distortion and the phase delay caused by the notch filter and the VCM driver.

21 Claims, 8 Drawing Sheets

METHOD, MEDIUM, AND APPARATUS CONTROLLING TRACK SEEK IN A RECORDING AND/OR REPRODUCING APPARATUS

CROSS-REFERENCE TO RELATED APPLICATIONS

This application claims the priority benefit of Korean Patent Application No. 10-2004-0100356, filed on Dec. 2, 2004, in the Korean Intellectual Property Office, the disclosure of which is hereby incorporated by reference in its entirety.

BACKGROUND OF THE INVENTION

1. Field of the Invention

Embodiments of the present invention relate to a method, medium, and apparatus controlling a hard disk drive, and more particularly, to a method, medium, and apparatus controlling a track seek of a hard disk drive, where the hard disk drive compensates for a gain distortion and a phase delay according to a sinewave acceleration trajectory.

2. Description of the Related Art

Recording and/or reproducing apparatuses, e.g., hard disk drives (HDDs), may include a plurality of magnetic transducers that may write and/or read data by sensing and/or magnetizing a magnetic field(s) of rotating media, e.g., disk(s). Data may be stored in a plurality of concentric tracks, with each of the concentric tracks potentially having disk and track numbers. Tracks having the same track number, in a plurality of disks, may be referred to as a cylinder. Hence, each track may also be defined by a cylinder number.

Transducers may typically be integrated within a slider incorporated into a head gimbal assembly (HGA) when the recording and/or reproducing apparatus is a HDD. Each HGA may be attached to an actuator arm, which may have a voice coil located adjacent to a magnetic assembly that makes up the voice coil motor. Hard disk drives typically include a controller and a driving circuit that supplies current to excite a voice coil motor. Thus, the voice coil motor may rotate an actuator arm and move transducers across the surface of a disk(s).

When data is written or read, the hard disk drive may execute a track seek control routine for moving transducers from one cylinder to another cylinder. During the track seek operation, a voice coil motor may be excited to move transducers over a disk surface to a new cylinder. A controller may control the current applied to the voice coil motor such that the transducers are accurately moved to the center of a track of a new cylinder, for example.

In such an operation, it may be preferable to minimize the time required to read or write data from or to a disk(s). Hence, in the track seek control routine, executed by the hard disk drive, transducers should be moved to a new cylinder within a period of time as short as possible. Also, the time required to stabilize an HGA should be minimized so that transducers can quickly write or read data and may be accurately located adjacent to a new cylinder.

Conventionally, transducers may be moved rapidly from one track to a target track by performing a track seek control using a square wave acceleration trajectory. Unfortunately, since a square wave involves a harmonic frequency with a high frequency component, the mechanical components or assemblies of the HGA are excited by the high frequency component causing the HGA to resonate. Accordingly, residual vibration creates auditory noise, undesired vibration, etc., and thus, there is an increase in the settling time and the whole seek time required to write or read data.

A conventional technique developed to solve this problem is a track seek control method using a sinewave acceleration trajectory. A track seek controller, using the sinewave acceleration trajectory, is advantageous in lessening vibration and noise. The track seek control method using the sinewave acceleration trajectory has been discussed in Japanese Patent Laid-Open Publication Nos. 2002-133799 (May 10, 2002), 1990-7506 (Jan. 12, 1990), 1998-241306 (Sep. 11, 1998), and Korean Patent Laid-Open Publication No. 2004-52273 (Jun. 23, 2004), for example.

Figure 1:
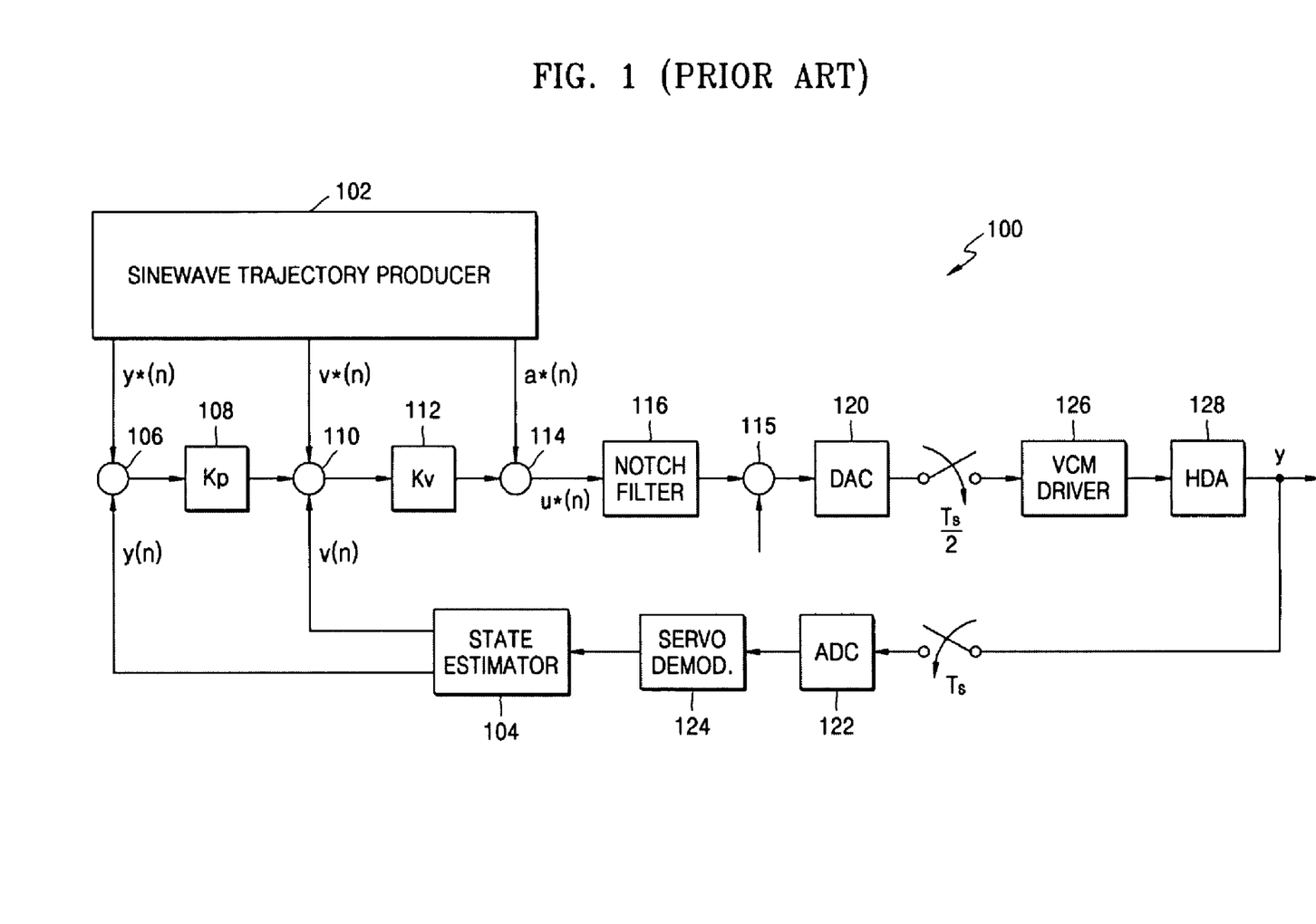
FIG. 1 illustrates a conventional track seek control apparatus using a sinewave acceleration trajectory.

FIG. 1 is a circuit diagram illustrating a conventional track seek control apparatus 100 using a sinewave acceleration trajectory. The track seek control apparatus 100 includes a sinewave trajectory producer 102, a notch filter 116, a voice coil motor (VCM) driver 126, a head gimbal assembly (HGA) 128, and a state estimator 104.

The track seek control apparatus 100 executes a track seek control routine to move a transducer to a target track that is a track seek distance $X_{SK}$ away from a first track. As defined below in Equation 1, the sinewave trajectory producer 102 may create a position $y^*(n)$, a velocity $v^*(n)$, and an acceleration $a^*(n)$ every sampling period 'n' according to the sinewave acceleration trajectory:

$$\begin{bmatrix} X_{\cos}(n) \\ X_{\sin}(n) \end{bmatrix} = \begin{bmatrix} \cos\left(\frac{2\pi}{N_{SK}}\right) & -\sin\left(\frac{2\pi}{N_{SK}}\right) \\ \cos\left(\frac{2\pi}{N_{SK}}\right) & \sin\left(\frac{2\pi}{N_{SK}}\right) \end{bmatrix} \begin{bmatrix} X_{\cos}(n-1) \\ X_{\sin}(n-1) \end{bmatrix} \quad (1)$$

$$a^*(n) = K_A I_M X_{\sin}(n),$$

$$I_M = \frac{2\pi X_{SK}}{K_A T_{SK}^2}$$

$$v^*(n) = K_A I_M \frac{T_{SK}}{2\pi} [1 - X_{\cos}(n)]$$

$$y^*(n) = K_A I_M \frac{T_{SK}}{2\pi} \left[ \frac{T_{SK}}{N_{SK}} n - \frac{T_{SK}}{2\pi} X_{\sin}(n) \right]$$

To calculate values of a sine function and a cosine function for producing the sinewave acceleration trajectory, the sine function and the cosine function are sampled every sampling period 'n', stored in a ROM table, and then read from the ROM table every sampling period n.

Meanwhile, a sine function and a cosine function, at one phase, can be derived from a sine function and a cosine function at another phase. Values of the sine function and the cosine function during a first sampling period are stored in the ROM table to calculate values of the sine function and the cosine function during other sampling period n, using the top sine/cosine equation of Equation 1, thereby reducing the necessary size the ROM table.

Values of a sine function and a cosine function, with respect to representative frequencies, during a first sampling period are stored in the ROM table and can be determined by interpolation. The frequency corresponds to a track seek distance and a track seek time. The track seek distance determines the track seek time, i.e., the frequency of a sinewave signal.

In the above Equation 1, constants $K_A$, $I_M$, $X_{SK}$, and $T_{SK}$ denote an acceleration constant, a maximum volume of current, a track seek distance, and a track seek time, respectively. The track seek time (or a track frequency) is calculated based on an idealized dual integrator model, current, and voltage with respect to the track seek distance, the notch filter 116, and the VCM driver 122 and stored in the ROM table.

Referring to FIG. 1, in this conventional system, an acceleration trajectory a, a velocity trajectory v, and a position trajectory y are obtained by Equation 1. A temporal axis is based on the track seek time $T_{SK}$. Thus, supposing that the track seek time $T_{SK}$ is 1, the acceleration trajectory a, the velocity trajectory v, and the position trajectory y can be obtained by Equation 1. The track seek time $T_{SK}$ corresponds to a period of the sinewave acceleration trajectory a. Here, the transducer is moved to the track seek distance $X_{SK}$ during the track seek time $T_{SK}$, producing the acceleration trajectory a.

The acceleration constant $K_A$, the maximum volume of current $I_M$, the track seek distance $X_{SK}$, and the track seek time $T_{SK}$ are given by the following Equation 2.

$$T_{SK} = \sqrt{\frac{2\pi}{K_A I_M} X_{SK}} \qquad (2)$$

Thus, here, Equation 2 indicates that the track seek time $T_{SK}$ is a root of the track seek distance $X_{SK}$.

Figure 2:
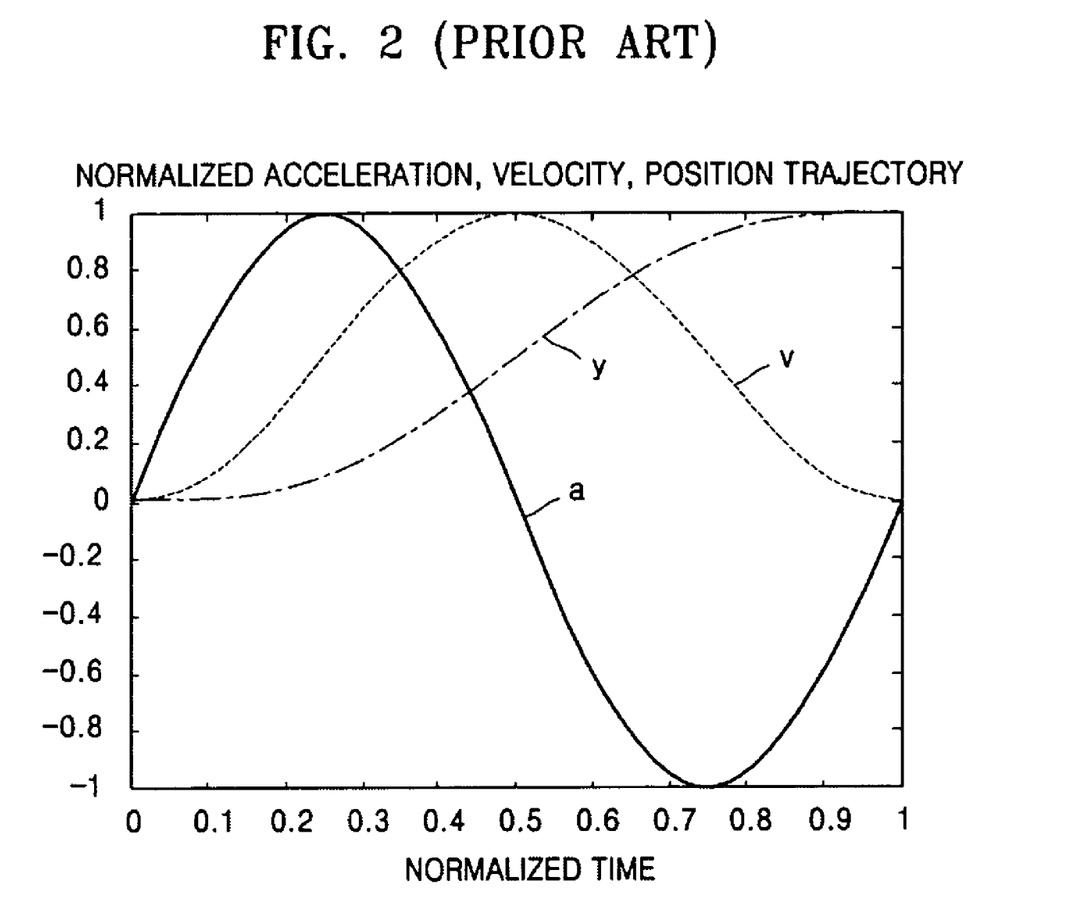
FIG. 2 illustrates a comparison of track seek distance versus track seek time.

FIG. 2 illustrates the track seek distance $X_{SK}$ versus the track seek time $T_{SK}$. The state estimator 104, thus, estimates an estimated position y(n) and an estimated velocity v(n) of transducers based on positions of transducers at previous sampling periods n−1, n−2, . . . , and at a present sampling period n.

A gray code recorded on a sector of the disk is used to obtain a track position, i.e., a track number and read by transducers moving over the a disk. The gray code read by transducers is provided to the state estimator 104.

Referring to FIG. 1, a VCM driving current u(n) applied to the notch filter 116 is determined by the following Equation 3.

$$u(n) = a^*(n) + K_v(v^*(n) - v(n)) + K_v K_p(y^*(n) - y(n)) \qquad (3)$$

The VCM driving current u(n), derived from Equation 3, is applied to the VCM driver 106 through the notch filter 116 to reduce vibration and noise caused by a track seek. The notch filter 116 is designed to control a frequency resonance. In such a system, the notch filter 116 and the VCM driver 126 are expressed as a constant gain in order to avoid complexity in the design of the seek trajectory. The HGA 128 is made up of a VCM, an arm, a head, and a disk in which the arm is moved by current that causes the VCM to move the head to a particular position to read the track position written on the disk, which is expressed as a dual integrator model in order to avoid complexity in the design of the seek trajectory.

Meanwhile, when the transducers move using the track seek control apparatus 100, a gain distortion and a phase delay are caused by the notch filter 116 and the VCM driver 126. While the track seek, based on Equation 1, is controlled by a dual integrator model combining the notch filter 116, the VCM driver 126, and the HGA 128, an actual system including the notch filter 116, the VCM driver 126, and the HGA 128 is actually different from the ideal dual integrator model.

Figure 3A:
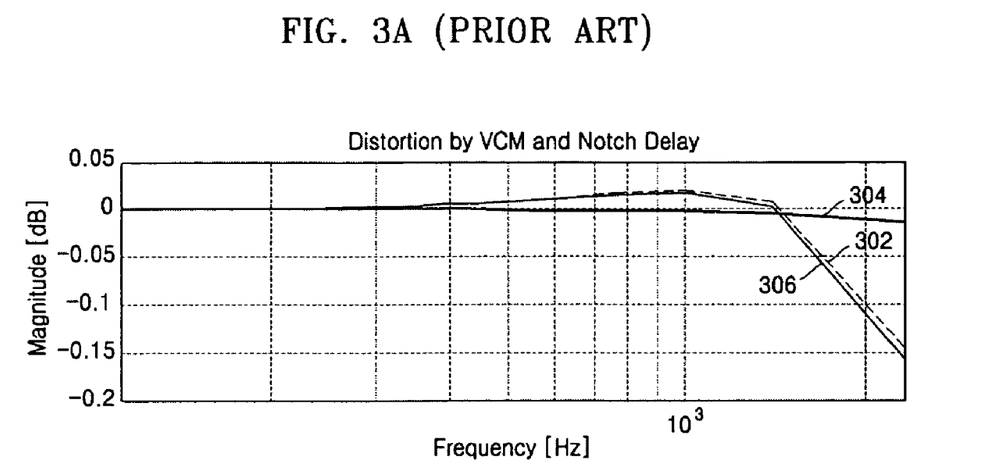
FIGS. 3A and 3B illustrating gain distortion and phase delay caused by a notch filter and a voice coil motor (VCM) driver.

FIGS. 3A and 3B illustrate gain distortion and phase delay caused by the notch filter 116 and the VCM driver 126. Referring to FIG. 3A, curves 302 and 304 indicate gain characteristics of the notch filter 116 and the VCM driver 126, respectively, and a curve 306 indicates the entire gain characteristics of the notch filter 116 and the VCM driver 126. Low frequencies have an ideal gain characteristic, whereas higher frequencies, i.e., shorter track seek distances, generate greater gain distortion.

Figure 3B:
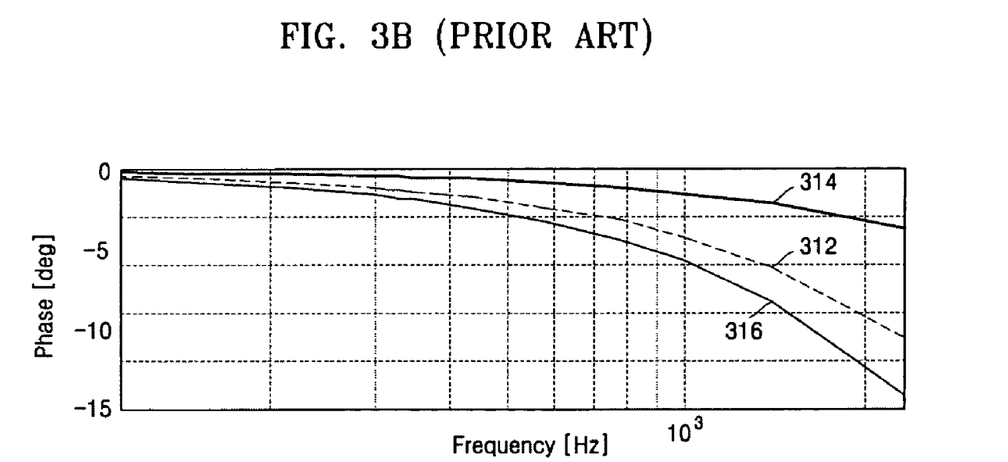

Referring to FIG. 3B, curves 312 and 314 indicate phase characteristics of the notch filter 116 and the VCM driver 126, respectively, and a curve 316 indicates the entire phase characteristics of the notch filter 116 and the VCM driver 126. Similarly, Low frequencies have ideal phase characteristics, whereas higher frequencies, i.e., shorter track seek distances, generate greater phase distortion.

The real-life gain distortion and the phase delay caused by the notch filter 116 and the VCM driver 126, thus, differentiate the real-life system from the ideal model, thereby preventing the transducers from moving along correct trajectories.

To correct for an error between the notch filter and the VCM driver, the track seek control method must use a high gain controller, i.e., a very sensitive controller, or it must be designed to pursue conservative standard trajectories, i.e., relatively slow trajectories. However, the conventional high gain controller causes noise and makes the whole system insecure, and accordingly, conventional standard trajectory designs cause track seek times to increase.

SUMMARY OF THE INVENTION

Embodiments of the present invention provide a method, medium, and apparatus of controlling a track seek of a hard disk drive, by which the hard disk drive compensates for a gain distortion and a phase delay caused by a notch filter and a VCM driver according to a sinewave acceleration trajectory.

Embodiments of the present invention also provide a hard disk drive, method, and medium compensating for a gain distortion and a phase delay caused by a notch filter and a VCM driver.

To achieve the above and/or other aspects and advantages, embodiments of the present invention include a method of controlling a track seek of a hard disk drive, which generates a voice coil motor (VCM) driving current using a sinewave acceleration trajectory having a frequency corresponding to a track seek distance, and which applies the VCM driving current through a notch filter to a VCM driver that drives a VCM actuator, the method including measuring a gain distortion and a phase delay caused by the notch filter and the VCM driver with respect to the frequency, expressing the measured gain distortion and the measured phase delay using a complex number, obtaining a new sinewave in which the measured gain distortion and measured phase delay are compensated for by using a sinewave of the frequency and the complex number, generating the VCM driving current using an acceleration trajectory in a form of the new sinewave, and driving the VCM actuator by applying the VCM driving current to the VCM driver through the notch filter.

The obtaining of the new sinewave may be performed by correcting a size and a phase of an ideal sinewave of the frequency, every sampling period, using the complex number.

In addition, the VCM driving current may include a position component, a velocity component, and an acceleration component, and the generating of the VCM driving current may be performed by compensating for the acceleration component only.

To achieve the above and/or other aspects and advantages, embodiments of the present invention include an apparatus to control a track seek of a hard disk drive that includes a notch filter for filtering a voice coil motor (VCM) driving current and a VCM driver for driving a voice coil motor corresponding to an output of the notch filter, the apparatus including a sinewave trajectory producer to calculate a position y*, a velocity v*, and an acceleration a*, according to acceleration trajectories, in a form of an ideal sinewave corresponding to a track seek distance and a new sinewave having a compensated for gain distortion and phase delay caused by the notch filter and the VCM driver, a state estimator to estimate a position y, a velocity v, and an acceleration a with which a transducer is moved over a disk, a first adder to subtract the estimated position y from the position y*, a position control gain compensator to obtain a position correction value by multiplying a resultant value from the first adder by a predetermined position gain Kp for position correction, a second adder to subtract an estimated velocity v(n) from a sum of the position correction value and the velocity v*, a velocity control gain compensator to obtain a velocity correction value by multiplying a resultant value from the second adder by a predetermined velocity gain Kv for velocity correction, and a third adder to subtract an estimated acceleration a(n) from a sum of the velocity correction value and the acceleration a* to obtain a VCM driving current u(n).

The new sinewave may be an inverse of a complex number identifying the gain distortion and phase delay.

Further, the sinewave trajectory producer may drive the position y* and the velocity v* according to an acceleration trajectory in a form of the ideal sinewave corresponding to a track seek distance, and drives the acceleration a* according to an acceleration trajectory in a form of the new sinewave.

To achieve the above and/or other aspects and advantages, embodiments of the present invention include a hard disk drive including a disk to store data, a spindle motor to rotate the disk, a transducer to write and/or read data to/from the disk, a voice coil motor (VCM) driver to drive a voice coil motor to move the transducer over a surface of the disk, a notch filter to filter a VCM driving current to drive the voice coil motor and to apply the filtered VCM driving current to the VCM driver, a controller to generate the VCM driving current to move the transducer according to acceleration trajectories in a form of an ideal sinewave corresponding to a track seek distance and a new sinewave having a compensated for gain distortion and phase delay caused by the notch filter and the VCM driver, wherein the controller, measures a gain distortion and a phase delay caused by the notch filter and the VCM driver with respect to a frequency corresponding to a track seek distance, obtains the new sinewave in which the measured gain distortion and measured phase delay are compensated for by from a complex number indicating the measured gain distortion and the measured phase delay with respect to the frequency, generates the VCM driving current using an acceleration trajectory in a form of the new sinewave, and drives a VCM actuator by applying the VCM driving current to the VCM driver through the notch filter.

To achieve the above and/or other aspects and advantages, embodiments of the present invention include a medium including computer readable code to implement a method of controlling a track seek of a hard disk drive, which generates a voice coil motor (VCM) driving current using a sinewave acceleration trajectory having a frequency corresponding to a track seek distance, and which applies the VCM driving current through a notch filter to a VCM driver that drives a VCM actuator, the method including measuring a gain distortion and a phase delay caused by the notch filter and the VCM driver with respect to the frequency, expressing the measured gain distortion and measured phase delay using a complex number, obtaining a new sinewave in which the measured gain distortion and measured phase delay are compensated for by using a sinewave of the frequency and the complex number, generating the VCM driving current using to acceleration trajectory in a form of the new, and driving the VCM actuator by applying the VCM driving current to the VCM driver through the notch filter.

The obtaining of the new sinewave may be performed using the sinewave of the frequency and the complex number.

In addition, the VCM driving current may include a position component, a velocity component, and an acceleration component, and the generating of the VCM driving current may be performed by compensating for the acceleration component only.

To achieve the above and/or other aspects and advantages, embodiments of the present invention include a recording and/or reproducing apparatus, including a means for obtaining a new sinewave in which a measured gain distortion and measured phase delay, of a driver and a filter, are compensated for by using another sinewave and a complex number representing the measured gain distortion and measured phase delay, a means for generating a driving current using an acceleration trajectory in a form of the new sinewave, and a means for driving an actuator by applying the driving current to the driver through the filter.

To achieve the above and/or other aspects and advantages, embodiments of the present invention include a method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method including obtaining a new sinewave in which gain distortion and phase delay caused by the notch filter and the VCM driver are compensated for by using a sinewave of the frequency and a complex number representing the gain distortion and phase delay, generating the VCM driving current using an acceleration trajectory in a form of the new sinewave, and driving the VCM actuator by applying the VCM driving current to the VCM driver through the notch filter.

To achieve the above and/or other aspects and advantages, embodiments of the present invention include a hard disk drive, including a controller to generate a voice coil motor (VCM) driving current using a sinewave acceleration trajectory having a frequency corresponding to a track seek distance, and to apply the VCM driving current through a notch filter to a VCM driver that drives a VCM actuator, wherein the controller further obtains a new sinewave in which gain distortion and phase delay caused by the notch filter and the VCM driver are compensated for by using a sinewave of the frequency and a complex number representing the gain distortion and phase delay, generates the VCM driving current using an acceleration trajectory in a form of the new sinewave, and drives the VCM actuator by applying the VCM driving current to the VCM driver through the notch filter.

To achieve the above and/or other aspects and advantages, embodiments of the present invention include a method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method including obtaining a new sinewave in which gain distortion caused by the notch filter and the VCM driver is compensated for by using a sinewave of the frequency and a complex number representing the gain distortion, generating the VCM driving current using an acceleration trajectory in a form of the new sinewave, and driving the VCM actuator by applying the VCM driving current to the VCM driver through the notch filter.

To achieve the above and/or other aspects and advantages, embodiments of the present invention include a method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method including obtaining a new sinewave in which phase delay caused by the notch filter and the VCM driver is compensated for by using a sinewave of the frequency and a complex number representing the phase delay, generating the VCM driving current using an acceleration trajectory in a form of the new sinewave, and driving the VCM actuator by applying the VCM driving current to the VCM driver through the notch filter.

To achieve the above and/or other aspects and advantages, embodiments of the present invention include a hard disk drive, including a controller to generate a voice coil motor (VCM) driving current using a sinewave acceleration trajectory having a frequency corresponding to a track seek distance, and to apply the VCM driving current through a notch filter to a VCM driver that drives a VCM actuator, wherein the controller further obtains a new sinewave in which gain distortion caused by the notch filter and the VCM driver is compensated for by using a sinewave of the frequency and a complex number representing the gain distortion, generates the VCM driving current using an acceleration trajectory in a form of the new sinewave, and drives the VCM actuator by applying the VCM driving current to the VCM driver through the notch filter.

To achieve the above and/or other aspects and advantages, embodiments of the present invention include a hard disk drive, including a controller to generate a voice coil motor (VCM) driving current using a sinewave acceleration trajectory having a frequency corresponding to a track seek distance, and to apply the VCM driving current through a notch filter to a VCM driver that drives a VCM actuator, wherein the controller further obtains a new sinewave in which phase delay caused by the notch filter and the VCM driver is compensated for by using a sinewave of the frequency and a complex number representing the phase delay, generates the VCM driving current using an acceleration trajectory in a form of the new sinewave, and drives the VCM actuator by applying the VCM driving current to the VCM driver through the notch filter.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to embodiments of the present invention, examples of which are illustrated in the accompanying drawings, wherein like reference numerals refer to the like elements throughout. Embodiments are described below to explain the present invention by referring to the figures.

Figure 4:
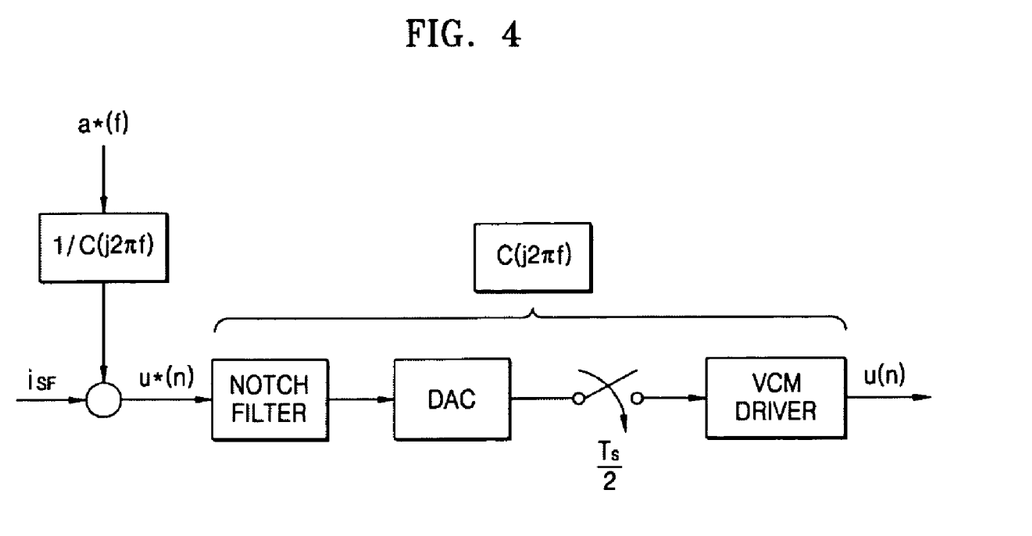
FIG. 4 illustrates a method for controlling a track seek of a hard disk drive, according to an embodiment of the present invention.

FIG. 4 illustrates a method for controlling a track seek of a hard disk drive, according to an embodiment of the present invention. Referring to FIG. 4, when a gain distortion and a phase delay, e.g., caused by a notch filter and a VCM driver, are expressed as a complex number $C(j2\pi f)$, a VCM driving current $u(n)$ can be generated to compensate for the value $1/C(j2\pi f)$, before being applied to the notch filter to prevent the gain distortion and the phase delay.

Since the notch filter and the VCM driver are connected in serial, the entire gain distortion mag_tot and the entire phase delay pha_tot, e.g., caused by the notch filter and the VCM driver may be expressed as follows.

$$\text{mag\_tot} = \text{mag\_not} * \text{mag\_vcm}$$

$$\text{pha\_tot} = \text{pha\_not} + \text{pha\_vcm} + \text{pha\_compdly}$$

Here, mag_not and mag_vcm can denote gain distortions caused by the notch filter and the VCM driver, respectively, and pha_not, pha_vcm, and pha_compdly can denote phase delays caused by the notch filter, the VCM driver, and an operation time.

The value $C(j2\pi f)$ of the gain distortion and the phase delay may be given by the following Equation 4.

$$C(j2\pi f) = \text{mag\_tot}(f) \exp^{j2\pi \text{pha\_tot}(f)} \quad (4)$$

Further, a compensation value $V(j2\pi f)$, used to compensate for the value $C(j2\pi f)$, may be given by the following Equation 5.

$$V = \frac{1}{C} = \frac{1}{\text{mag\_tot}(f) \exp^{j2\pi \text{pha\_tot}(f)}} \quad (5)$$

$$\text{Re}(V(j2\pi f)) = \frac{1}{\text{mag\_tot}(f)} \cos(2\pi \text{pha\_tot}(f))$$

-continued $$\text{Im}(V(j2\pi f)) = -\frac{1}{\text{mag\_tot}(f)}\sin(2\pi\text{pha\_tot}(f))$$

Here, Re(V(j2πf)) and Im(V(j2πf)) may denote values of the gain distortion and the phase delay, with respect to a standard sinewave, based on an ideal model. The value 1/C(j2πf) used to compensate for the gain distortion and the phase delay, thus, may be obtained from the value C(j2πf) of the gain distortion and the phase delay.

A new sinewave may be generated, using the ideal sinewave, for obtaining the position y*(n), the velocity v*(n), and the acceleration a*(n), according to the aforementioned sinewave acceleration trajectory referenced in Equation 1, and the value 1/C(j2πf) may be used to compensate for the gain distortion and the phase delay. Here, a new acceleration trajectory, produced by the new sinewave, may be used to generate a VCM driving current u*(n) to compensate for the value C(j2πf) of the gain distortion and the phase delay, e.g., caused by the notch filter and the VCM driver.

Thus, although the gain distortion and the phase delay may occur, a modified VCM driving current u*(n) can compensate for the corresponding value C(j2πf) of the gain distortion and the phase delay, the track seek of the hard disk drive can still be controlled using a VCM driving current u(n) using the ideal sinewave acceleration trajectory, for example.

The gain distortion and the phase delay may be compensated for using the acceleration a* only, for example. In this case, since the gain and phase are varied by the change in the position y* and the velocity v* rather than the gain distortion and the phase delay, e.g, caused by the notch filter and the VCM driver, the effect obtained by the compensating of the acceleration a* may be sufficient.

Figure 5:
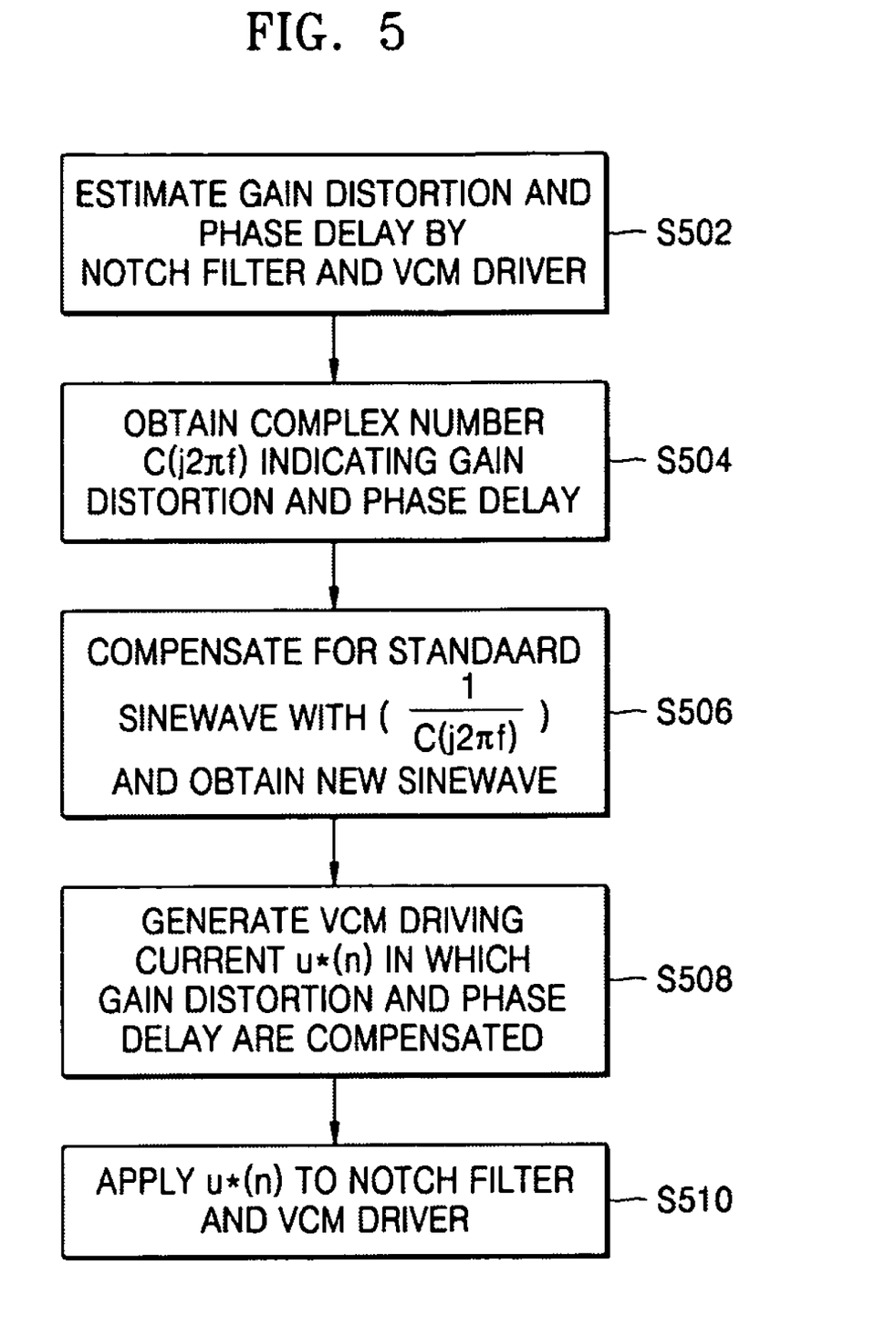
FIG. 5 illustrates a controlling of a track seek of a hard disk drive, according to an embodiment of the present invention.

FIG. 5 illustrates a controlling of a track seek of a hard disk drive, according to an embodiment of the present invention. Referring to FIG. 5, the gain distortion and phase delay and a phase delay caused by an operation time can be measured, in operation s502. A gain distortion and the phase delay caused by the notch filter and the VCM driver may be measured by sweeping frequencies of sinewave signals, which may be applied to the notch filter and the VCM driver. The gain characteristics and the phase characteristics obtained by measuring of the gain distortion and the phase delay are illustrated in FIGS. 3A and 3B.

A complex number value C(j2πf) indicating the gain distortion and the phase delay with respect to a track seek time $T_{SK}$ is calculated from a result of operation s502, in operation s504.

In an embodiment of the present invention, an inverse number V(j2πf), of the complex number value C(j2πf), with respect to a representative frequency, may be calculated. To be more specific, a real number Re(V(j2πf)) and an imaginary number Im(V(j2πf)) of the inverse number V(2πf) may be calculated and stored in a memory, e.g., a ROM table, according to the track seek time $T_{SK}$, in operation s506, for example.

Sinewaves used to compensate for the gain distortion and the phase delay, with respect to a track seek time $T_{SK}$, i.e., cos(p($T_{SK}$)) and sin(p($T_{SK}$)), may be given by the following Equation 6.

$$\cos(p(T_{SK})) = \frac{1}{\text{mag\_tot}\left(\frac{1}{T_{SK}}\right)}\cos\left(2\pi\text{pha\_tot}\left(\frac{1}{T_{SK}}\right)\right) \quad (6)$$

$$\sin(p(T_{SK})) = -\frac{1}{\text{mag\_tot}\left(\frac{1}{T_{SK}}\right)}\sin\left(2\pi\text{pha\_tot}\left(\frac{1}{T_{SK}}\right)\right)$$

A real number cos(p($T_{SK}$)) and an imaginary number sin(p($T_{SK}$)) of a complex number V($^2$*pi/$T_{SK}$), indicating a compensation value of the gain distortion and the phase delay with respect to a track seek time $T_{SK}$, thus, may be sampled according to a representative track time and stored in the ROM table, for example. In this case, the ROM table may store cos(2*pi/$N_{SK}$) and sin(2*pi/$N_{SK}$) to generate the ideal sinewave, and cos(p($T_{SK}$)) and sin(p($T_{SK}$)) corresponding to compensation values of the gain distortion and the phase delay, according to a track seek time $N_{SK}$ (or $T_{SK}$) (or according to frequencies, for example).

The ROM table may actually store cos(2*pi/$N_{SK}$) and sin(2*pi/$N_{SK}$) and cos(p($T_{SK}$)) and sin(p($T_{SK}$)) corresponding to the compensation values of the gain distortion and the phase delay during a first sampling period with respect to the track seek time $T_{SK}$ ($N_{SK}$). A sin/cos relation and interpolation given by Equation 7 may, thus, be used to obtain compensation values during a sampling period after the first sampling period with respect to other track seek times.

The VCM driving current u*(n), where the gain distortion and the phase delay have been compensated, may be obtained during each sampling period with respect to the track seek time $T_{SK}$, in operation s508. The VCM driving current u*(n) may include a position command y*(n), a velocity command v*(n), an acceleration command a*(n), an actual position y(n), and an estimated velocity v(n), for example.

The ideal sinewave for calculating the position y*(n), the velocity v*(n), and the acceleration a*(n), e.g., in Equation 1, and a new sinewave for calculating the acceleration command a*(n), in which the gain distortion and the phase delay have been compensated, may be obtained using the bellow Equation 7, with the VCM driving current u*(n) being generated to compensate for the value C(j2πf) representing the gain distortion and the phase delay.

$$\begin{bmatrix} X_{\cos}(n) \\ X_{\sin}(n) \end{bmatrix} = \begin{bmatrix} \cos\left(\frac{2\pi}{N_{SK}}\right) & -\sin\left(\frac{2\pi}{N_{SK}}\right) \\ \cos\left(\frac{2\pi}{N_{SK}}\right) & \sin\left(\frac{2\pi}{N_{SK}}\right) \end{bmatrix} \begin{bmatrix} X_{\cos}(n-1) \\ X_{\sin}(n-1) \end{bmatrix} \quad (7)$$

$$\begin{bmatrix} \overline{X}_{\cos}(n) \\ \overline{X}_{\sin}(n) \end{bmatrix} = \begin{bmatrix} \cos(p) & -\sin(p) \\ \sin(p) & \cos(p) \end{bmatrix} \begin{bmatrix} X_{\cos}(n-1) \\ X_{\sin}(n-1) \end{bmatrix},$$

$$n = 1, 2, \ldots, N_{SK}$$

$$a^*(n) = K_A I_M \overline{X}_{\sin}(n),$$

$$I_M = \frac{2\pi X_{SK}}{K_A T_{SK}^2}$$

$$v^*(n) = K_A I_M \frac{T_{SK}}{2\pi}[1 - X_{\cos}(n)]$$

$$y^*(n) = K_A I_M \frac{T_{SK}}{2\pi}\left[\frac{T_{SK}}{N_{SK}}n - \frac{T_{SK}}{2\pi}X_{\sin}(n)\right]$$

The new sinewave, in which the gain distortion and the phase delay have been compensated, may, thus, be obtained by correcting the size and phase of the ideal sinewave, e.g., as used in Equation 1, using the complex number used to compensate for the gain distortion and the phase delay, as shown in the above Equation 7. According to a method for controlling the track seek of the hard disk drive, the compensation values of the gain distortion and the phase delay, with respect to the representative seek times, may be stored in a memory, e.g., the ROM table, and the new sinewave compensating for the gain distortion and the phase delay may be is obtained every sampling period, for example, using the ideal sinewave and the aforementioned complex number, as shown in Equation 7. Such a method may not use every gain distortion and phase delay during a period of a sinewave signal, with respect to the track seek time $T_{SK}$, which means that of the ROM table may be kept small.

The VCM driving current u*(n), where the gain distortion and the phase delay have been compensated, may, thus, be applied to the notch filter and the VCM driver, in operation s510.

According to a method of controlling the track seek of the hard disk drive shown in FIG. 5, the value C(j2πf), e.g., indicating the gain distortion and the phase delay caused by the notch filter and the VCM driver, can be compensated and the VCM driving current u*(n) can be generated, thereby enabling the controlling of the track seek while still using a VCM driving current u(n) according to the ideal sinewave acceleration trajectory, for example.

In comparison with Equation 1 and Equation 7, in an embodiment of the present invention, only the acceleration a* may be compensated in the VCM driving current u(n). Since the gain and phase are varied by the change in the position y* and the velocity v* in the VCM driving current u(n), rather than by the gain distortion and the phase delay, compensating for the acceleration a* may be sufficient.

Figure 6:
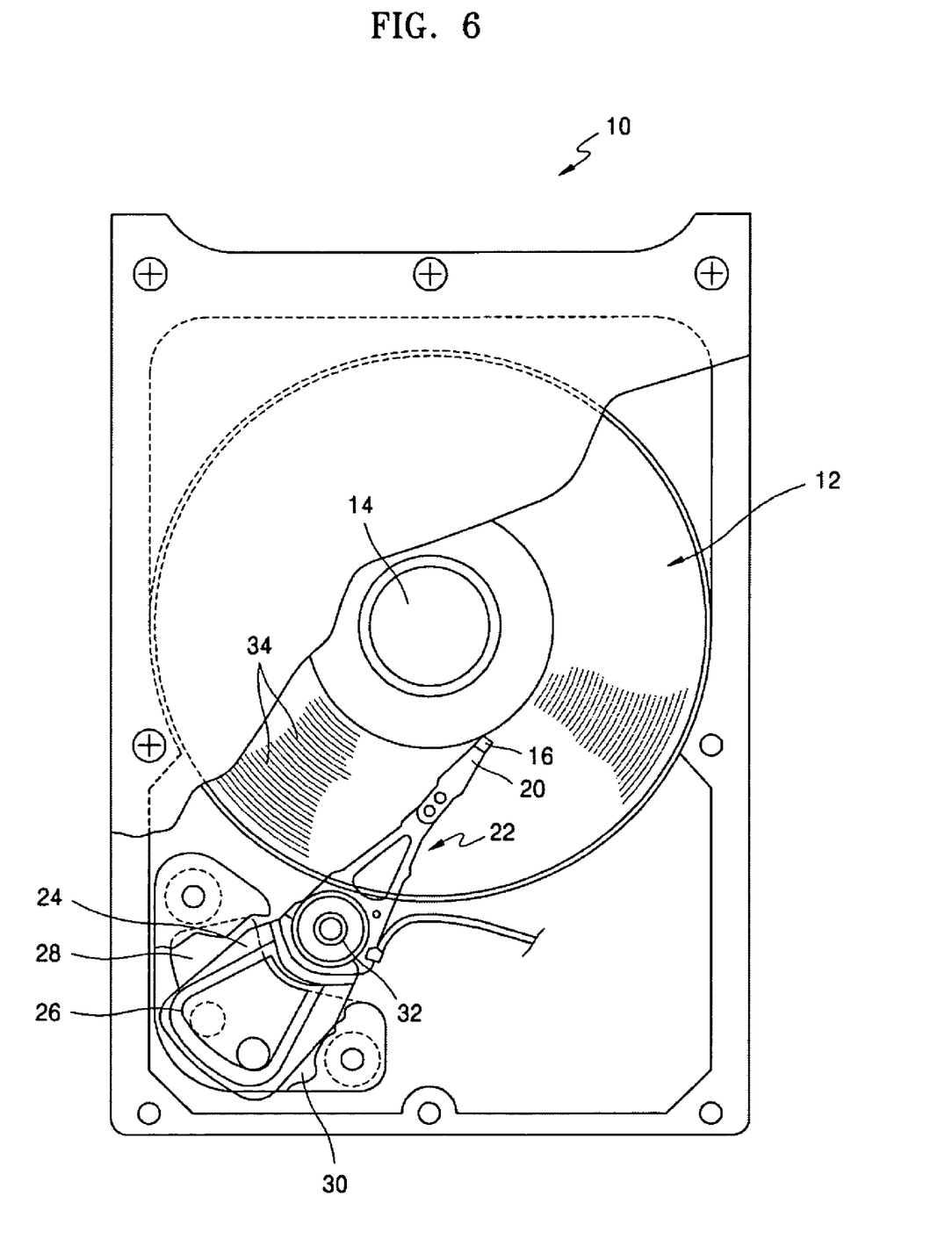
FIG. 6 illustrates a hard disk drive, according to an embodiment of the present invention.

FIG. 6 illustrates a hard disk drive 10, according to an embodiment of the present invention. Referring to FIG. 6, the hard disk drive 10 may include at least one magnetic disk 12, rotatable by a spindle motor 14. The hard disk drive 10 may also include a transducer 16, which may be adjacent to the surface of the magnetic disk 12.

Here, the transducer 16 may write and/or read data to or from the rotating disk 12, e.g., by magnetizing and sensing the magnetic field of the disk 12. The transducer 16 may typically be oriented with the surface of the disk 12. Although only one transducer 16 is illustrated, the transducer 16 may include a writing transducer for magnetizing the disk 12 and a reading transducer for sensing the magnetic field of the disk 12, for example. The reading transducer may be made from a magneto-resistive (MR) element, as a further example.

The transducer 16 may be incorporated into a slider 20 capable of generating an air bearing with the spacing between the transducer 16 and the surface of the disk 12. The slider 20 may also be incorporated into a head gimbal assembly (HGA) 22, and the HGA 22 may be attached to an actuator arm 24 having a voice coil 26. The voice coil 26 can be adjacent to a magnetic assembly 28, making up a voice coil motor (VCM) 30. The current supplied to the voice coil 26 generates a torque that rotates the actuator arm 24 around a bearing assembly 32 moving the transducer 16 across the surface of the disk 12.

Information may typically be stored in annular tracks 34 of the disk 12. Each of the tracks 34 may generally include a plurality of sectors, each of which may include a data field and an identification field. The identification field may also include gray codes that identify sectors and tracks (cylinders). The transducer 16, thus, may move across the surface of the disk 12 in order to read/write data from/to a track.

Figure 7:
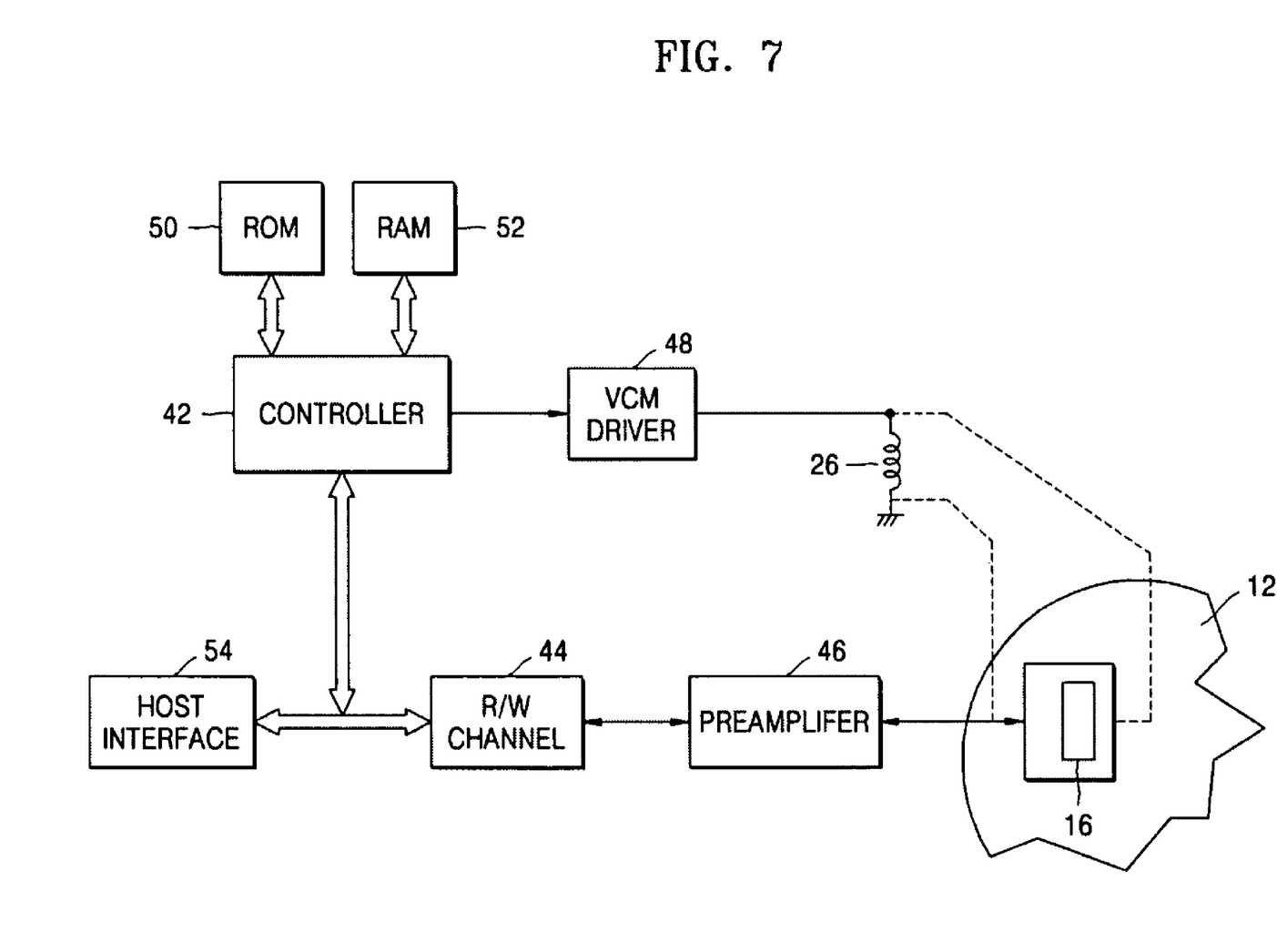
FIG. 7 illustrates an electric system to control a hard disk drive, according to an embodiment of the present invention.

FIG. 7 illustrates an electric system 40 to control the hard disk drive 10. Referring to FIG. 7, the electric system 40 may include a controller 42, which is combined with the transducer 16 via a read/write (R/W) channel 44 and a pre-amplifier 46. The controller 42 may be a digital signal processor (DSP), a micro-processor, a micro-controller, or the like, for example. The controller 42 may apply a control signal to the R/W channel 44 to initiating a reading/writing of data. The data may typically be transferred from the R/W channel 44 to a host interface 54, and the host interface 54 may include a buffer memory and a control circuit that allow the disk drive to interface with a system such as a personal computer.

The controller 42 may also be combined with a VCM driver 48, supplying a driving current to the voice coil 26. Here, the controller 42 supplies a control signal to the VCM driver 48 to excite the VCM 30 of FIG. 1 and to control the motion of the transducer 16.

The controller 42 may be connected to a non-volatile memory, for example, such as a read only memory (ROM) 50 or a flash memory, and a random access memory (RAM) 52. The ROM and RAM 50 and 52 may store instructions and/or data that may be used by the controller 42 to execute routines. An example of a software routine may be a seek control routine for moving the transducer 16 from one track to another track. The seek control routine may include a servo control routine ensuring that the transducer 16 is moved to a correct track. In an embodiment of the present invention, the ROM 50 may contain execution codes and ROM tables for generating the compensated VCM driving current, according to a compensated sinewave acceleration trajectory where the gain distortion and the phase delay in FIG. 5, and Equations 4 through 7, for example, are compensated for.

Figure 8:
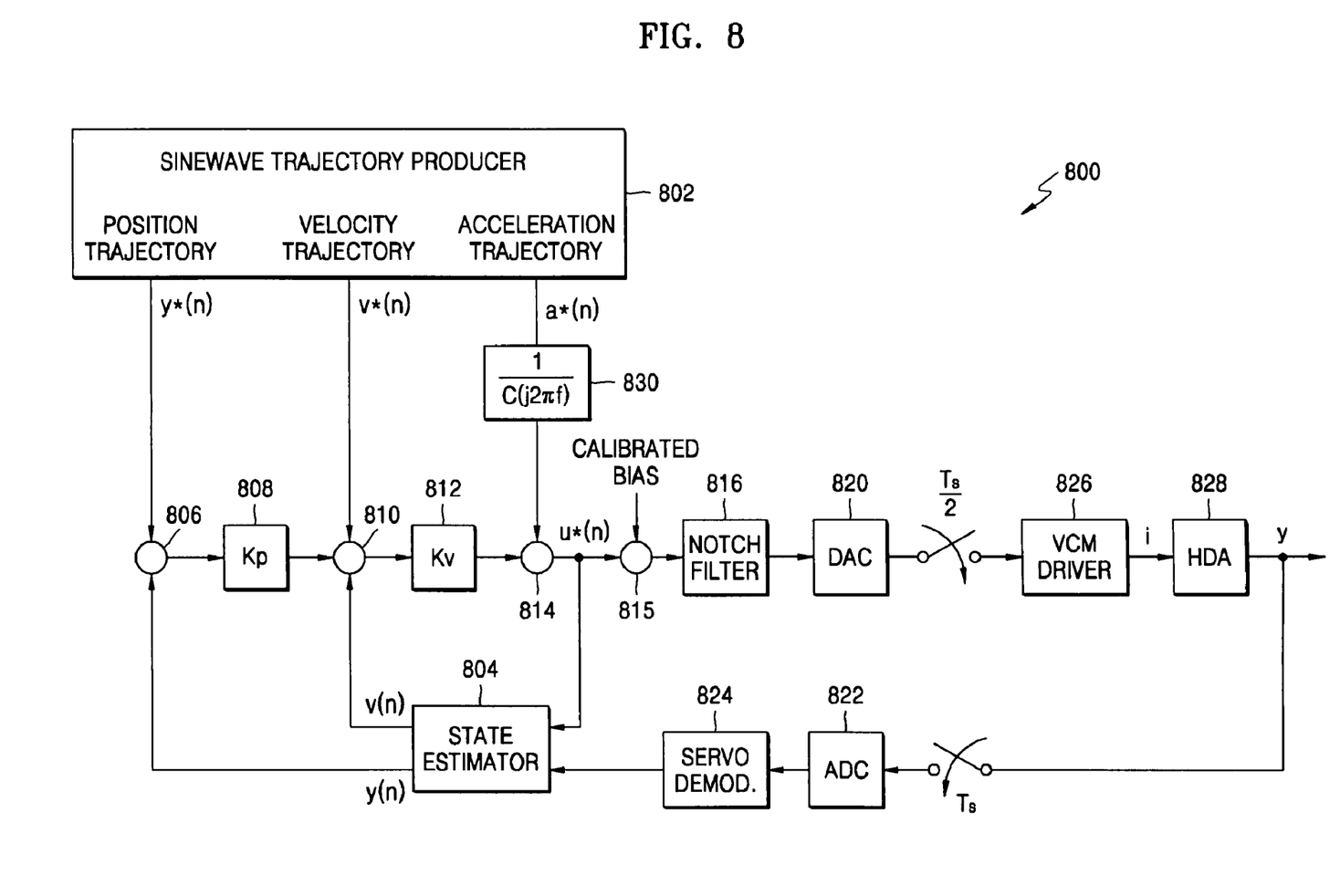
FIG. 8 illustrates an apparatus to control a track seek, according to an embodiment of the present invention.

FIG. 8 illustrates an apparatus 800 to control a track seek, according to an embodiment of the present invention. Referring to FIG. 8, the apparatus 800 may be implemented with hardware and/or software, e.g., as executed by the controller 42 shown in FIG. 7. According to this embodiment of the present invention, the apparatus 800 may drive the transducer 16 to be accurately located over a target track of the disk 12.

The controller 42 may execute a seek control routine where the transducer 16 is moved from a present track to a target track, a track seek distance $X_{SK}$ away from the present track. The aforementioned gray codes of at least one track, between the present and target tracks, may be read by the transducer 16 as it moves across the disk 12. The read gray codes may then be used, for example, by the controller 42 to periodically determine whether the transducer 16 has moved across tracks at a target velocity and at a target acceleration.

The apparatus 800, controlling the track seek, may include a state estimator 804, e.g., implemented in hardware and/or software. Although the position of the transducer 16 can be determined by reading out the gray codes of the track, an actual position of the transducer 16 may be different from that determined by the gray codes. Such a difference may, thus, be determined by the state estimator 804.

The state estimator 804 may determine an estimated position y(n) to which the transducer 16 has moved from positions during previous sampling periods (n−1), (n−2) . . . and a position at a present sampling period n. An estimation operation of the state estimator 804, used to control the track seek of the hard disk drive, has been discussed in detail in Korean Patent Laid-Open Publication No. 2004-55273 (Jun. 23, 2004).

The state estimator 804 may also determine an estimated velocity v(n) and an estimated acceleration a(n) of the transducer 16 from the estimated position y(n). The gray codes can be periodically sampled as the transducer 16 moves to a new track location. Hence, the controller 42 can accurately control the motion of the transducer 16. According to an embodiment of the present invention, VCM driving current u*(n) and position y may be input to state estimator 804, with position y being sampled 1/Ts intervals through ADC 822 and servo demodulator 824.

A sinewave seek trajectory producer 802 may calculate a position y*(n), a velocity v*(n), and an acceleration a*(n) from an acceleration trajectory, a velocity trajectory, and a position trajectory, for example, as obtained by integrating the acceleration trajectory each time the transducer 16 reads out the gray codes of a track 34.

A first adder 806 may subtract the estimated position y(n) from the position y*(n). A position control gain compensator 808 may then obtain a position correction value by multiplying the difference between the position y(n) and the estimated position y(n) by a position gain $k_p$ for position correction.

A second adder 810 may add the position correction value to the velocity v*(n) and subtract the estimated velocity v(n) from the sum of the position correction value and the velocity v*(n).

Then, a velocity control gain compensator 812 may obtain a velocity correction value by multiplying the difference between the velocity v*(n) and the estimated velocity v(n) by a velocity gain $k_v$, for example, for velocity correction.

Thereafter, a third adder 814 may add the velocity correction value to the acceleration a*(n) and obtain the VCM driving current u*(n) in which the gain distortion and the phase delay have been compensated.

The VCM driving current u*(n) may then be applied to a VCM actuator 826 through a notch filter 816. Then, the VCM actuator 826 may vary the value of current supplied to a voice coil, based on the input VCM driving current u*(n), and consequently vary an acceleration of the transducer 16.

A fourth adder 815 may add a calibrated bias to the VCM driving current u*(n), with the bias being a force applied to the transducer 16 according to the position of the transducer 16 on the disk. The output of the fourth adder 815 may then be applied to the notch filter 816, DAC 820, and selectively the VCM driver 826 and HDA 828.

According to the apparatus 800, controlling the track seek, the sinewave seek trajectory producer 802 may produce the sinewave trajectory acceleration a*(n), which has been compensated for gain distortion and phase delay, e.g., caused by the notch filter 816 and the VCM driver 826, using a gain distortion and phase delay compensator 830 as shown in FIG. 8. The VCM driving current u(n), produced from the VCM driver 826, may be generated according to the ideal sinewave acceleration trajectory in which the gain distortion and the phase delay are compensated.

Embodiments of the present invention may be included in medium, e.g., a computer-readable recording medium, as a computer-readable code to implement corresponding embodiments. Such media may include every kind of recording/transferring device that stores/transfers computer system-readable data. For example, ROMs, RAMs, CD-ROMs, magnetic tapes, floppy discs, optical data storage., etc., may be used as media. Media may also be realized in the form of a carrier wave (e.g., transmission through Internet). The media may be dispersed in a network-connecting computer system, for example, resulting in embodiments of the present invention being stored/transferred and implemented by a computer-readable code in a dispersed manner.

According to embodiments of the present invention, in a controlling of a track seek of a hard disk drive, a VCM driving current may be managed to compensate for a gain distortion and a phase delay so that the gain distortion and the phase delay caused by a notch filter and a VCM driver can be compensated for effectively.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of controlling a track seek of a hard disk drive, which generates a voice coil motor (VCM) driving current using a sinewave acceleration trajectory having a frequency corresponding to a track seek distance, and which applies the VCM driving current through a notch filter to a VCM driver that drives a VCM actuator, the method comprising:

measuring a gain distortion and a phase delay caused by the notch filter and the VCM driver with respect to the frequency;

expressing the measured gain distortion and the measured phase delay using a complex number;

obtaining a new sinewave in which the measured gain distortion and measured phase delay are compensated for by using a sinewave of the frequency and the complex number;

generating the VCM driving current using an acceleration trajectory in a form of the new sinewave; and driving the VCM actuator by applying the VCM driving current to the VCM driver through the notch filter.

2. The method of claim 1, wherein the obtaining of the new sinewave is performed by correcting a size and a phase of an ideal sinewave of the frequency, every sampling period, using the complex number.

3. The method of claim 1, wherein the VCM driving current includes a position component, a velocity component, and an acceleration component, and wherein the generating of the VCM driving current is performed by compensating for the acceleration component only.

4. An apparatus to control a track seek of a hard disk drive that includes a notch filter for filtering a voice coil motor (VCM) driving current and a VCM driver for driving a voice coil motor corresponding to an output of the notch filter, the apparatus comprising:

a sinewave trajectory producer to calculate a position y*, a velocity v*, and an acceleration a*, according to acceleration trajectories, in a form of an ideal sinewave corresponding to a track seek distance and a new sinewave having a compensated for gain distortion and phase delay caused by the notch filter and the VCM driver;

a state estimator to estimate a position y, a velocity v, and an acceleration a with which a transducer is moved over a disk;

a first adder to subtract the estimated position y from the position y*;

a position control gain compensator to obtain a position correction value by multiplying a resultant value from the first adder by a predetermined position gain Kp for position correction;

a second adder to subtract an estimated velocity v(n) from a sum of the position correction value and the velocity v*;

a velocity control gain compensator to obtain a velocity correction value by multiplying a resultant value from the second adder by a predetermined velocity gain Kv for velocity correction; and a third adder to subtract an estimated acceleration a(n) from a sum of the velocity correction value and the acceleration a* to obtain a VCM driving current u(n).

5. The apparatus of claim 4, wherein the new sinewave is corresponding to an inverse of a complex number identifying the gain distortion and phase delay.

6. The apparatus of claim 4, wherein the sinewave trajectory producer drives the position y* and the velocity v* according to an acceleration trajectory in a form of the ideal sinewave corresponding to a track seek distance, and drives the acceleration a* according to an acceleration trajectory in a form of the new sinewave.

7. A hard disk drive comprising:
a disk to store data
a spindle motor to rotate the disk;
a transducer to write and/or read data to/from the disk;
a voice coil motor (VCM) driver to drive a voice coil motor to move the transducer over a surface of the disk;
a notch filter to filter a VCM driving current to drive the voice coil motor and to apply the filtered VCM driving current to the VCM driver
a controller to generate the VCM driving current to move the transducer according to acceleration trajectories in a form of an ideal sinewave corresponding to a track seek distance and a new sinewave having a compensated for gain distortion and phase delay caused by the notch filter and the VCM driver,
wherein the controller:
measures a gain distortion and a phase delay caused by the notch filter and the VCM driver with respect to a frequency corresponding to a track seek distance;
obtains the new sinewave in which the measured gain distortion and measured phase delay are compensated for by from a complex number indicating the measured gain distortion and the measured phase delay with respect to the frequency;
generates the VCM driving current using an acceleration trajectory in a form of the new sinewave; and
drives a VCM actuator by applying the VCM driving current to the VCM driver through the notch filter.

8. A comruter readable recording medium comprising computer readable code to implement a method of controlling a track seek of a hard disk drive, which generates a voice coil motor (VCM) driving current using a sinewave acceleration trajectory having a frequency corresponding to a track seek distance, and which applies the VCM driving current through a notch filter to a VCM driver that drives a VCM actuator, the method comprising:
measuring a gain distortion and a phase delay caused by the notch filter and the VCM driver with respect to the frequency;
expressing the measured gain distortion and measured phase delay using a complex number;
obtaining a new sinewave in which the measured gain distortion and measured phase delay are compensated for by using a sinewave of the frequency and the complex number;
generating the VCM driving current using to acceleration trajectory in a form of the new and
driving the VCM actuator by applying the VCM driving current to the VCM driver through the notch filter.

9. The medium of claim 8, wherein the obtaining of the new sinewave is performed using the sinewave of the frequency and the complex number.

10. The medium of claim 8,
wherein the VCM driving current includes a position component, a velocity component, and an acceleration component, and
wherein the generating of the VCM driving current is performed by compensating for the acceleration component only.

11. A recording and/or reproducing apparatus, comprising:
a means for obtaining a new sinewave in which a gain distortion and phase delay, of a driver and a filter, are compensated for by using another sinewave and a complex number representing the gain distortion and phase delay;
a means for generating a driving current using an acceleration trajectory in a form of the new sinewave; and
a means for driving an actuator by applying the driving current to the driver through the filter.

12. A method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method comprising:
obtaining a new sinewave in which gain distortion and phase delay caused by the notch filter and the VCM driver are compensated for by using a sinewave of the frequency and a complex number representing the gain distortion and phase delay;
generating the VCM driving current using an acceleration trajectory in a form of the new sinewave; and
driving the VCM actuator by applying the VCM driving current to the VCM driver through the notch filter.

13. The method of claim 12, wherein the obtaining of the new sinewave is performed by correcting a size and a phase of an ideal sinewave of the frequency, every sampling period, using the complex number.

14. The method of claim 12,
wherein the VCM driving current includes a position component, a velocity component, and an acceleration component, and
wherein the generating of the VCM driving current is performed by compensating for the acceleration component only.

15. A hard disk drive, comprising:
a controller to generate a voice coil motor (VCM) driving current using a sinewave acceleration trajectory having a frequency corresponding to a track seek distance, and to apply the VCM driving current through a notch filter to a VCM driver that drives a VCM actuator,
wherein the controller further obtains a new sinewave in which gain distortion and phase delay caused by the notch filter and the VCM driver are compensated for by using a sinewave of the frequency and a complex number representing the gain distortion and phase delay, generates the VCM driving current using an acceleration trajectory in a form of the new sinewave, and drives the VCM actuator by applying the VCM driving current to the VCM driver through the notch filter.

16. The hard disk drive of claim 15, wherein the obtaining of the new sinewave is performed by correcting a size and a phase of an ideal sinewave of the frequency, every sampling period, using the complex number.

17. The hard disk drive of claim 15,
wherein the VCM driving current includes a position component, a velocity component, and an acceleration component, and
wherein the generating of the VCM driving current is performed by compensating for the acceleration component only.

18. A method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method comprising:
obtaining a new sinewave in which gain distortion caused by the notch filter and the VCM driver is compensated for by using a sinewave of the frequency and a complex number representing the gain distortion;
generating the VCM driving current using an acceleration trajectory in a form of the new sinewave; and
driving the VCM actuator by applying the VOM driving current to the VCM driver through the notch filter.

19. A method of controlling a hard drive, which generates a voice coil motor (VCM) driving current using a sinewave acceleration trajectory having a frequency corresponding to a track seek distance, and which applies the VCM driving current through a notch filter to a VCM driver that drives a VCM actuator, the method comprising:
obtaining a new sinewave in which phase delay caused by the notch filter and the VCM driver is compensated for by using a sinewave of the frequency and a complex number representing the phase delay;
generating the VCM driving current using an acceleration trajectory in a form of the new sinewave; and
driving the VCM actuator by applying the VCM driving current to the VCM driver through the notch filter.

20. A hard disk drive, comprising:
a controller to generate a voice coil motor (VCM) driving current using a sinewave acceleration trajectory having a frequency corresponding to a track seek distance, and to apply the VCM driving current through a notch filter to a VCM driver that drives a VCM actuator,
wherein the controller further obtains a new sinewave in which gain distortion caused by the notch filter and the VCM driver is compensated for by using a sinewave of the frequency and a complex number representing the gain distortion, generates the VCM driving current using an acceleration trajectory in a form of the new sinewave, and drives the VCM actuator by applying the VCM driving current to the VCM driver through the notch filter.

21. A hard disk drive, comprising:
a controller to generate a voice coil motor (VCM) driving current using a sinewave acceleration trajectory having a frequency corresponding to a track seek distance, and to apply the VCM driving current through a notch filter to a VOM driver that drives a VCM actuator,
wherein the controller further obtains a new sinewave in which phase delay caused by the notch filter and the VCM driver is compensated for by using a sinewave of the frequency and a complex number representing the phase delay, generates the VCM driving current using an acceleration trajectory in a form of the new sinewave, and drives the VCM actuator by applying the VCM driving current to the VCM driver through the notch filter.

* * * * *

UNITED STATES PATENT AND TRADEMARK OFFICE
CERTIFICATE OF CORRECTION

PATENT NO. : 7,248,428 B2
APPLICATION NO. : 11/291926
DATED : July 24, 2007
INVENTOR(S) : Nam-guk Kim et al.

It is certified that error appears in the above-identified patent and that said Letters Patent is hereby corrected as shown below:

Column 15, Line 25, after "data" insert --;--.

Column 15, Line 33, after "driver" insert --;--.

Column 15, Line 53, change "comruter" to --computer--.

Column 16, Line 6, after "new" insert --;--.

Column 17, Line 28, change "VOM" to --VCM--.

Column 18, Line 27, change "VOM" to --VCM--.

Signed and Sealed this

Fourth Day of December, 2007

JON W. DUDAS
*Director of the United States Patent and Trademark Office*